United States Patent
Tsuchiya

(10) Patent No.: US 10,471,593 B2
(45) Date of Patent: Nov. 12, 2019

(54) ROTATION DRIVING APPARATUS, ROBOT APPARATUS, CONTROL PROGRAM, AND ARTICLE MANUFACTURING METHOD

(71) Applicant: CANON KABUSHIKI KAISHA, Tokyo (JP)

(72) Inventor: Yutaka Tsuchiya, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 15/265,534

(22) Filed: Sep. 14, 2016

(65) Prior Publication Data

US 2017/0087719 A1    Mar. 30, 2017

(30) Foreign Application Priority Data

Sep. 24, 2015   (JP) ................................. 2015-186265

(51) Int. Cl.
    *B25J 9/16*         (2006.01)
(52) U.S. Cl.
    CPC ........... *B25J 9/1651* (2013.01); *B25J 9/1694* (2013.01)
(58) Field of Classification Search
    CPC combination set(s) only.
    See application file for complete search history.

(56) References Cited

U.S. PATENT DOCUMENTS

| | | | | |
|---|---|---|---|---|
| 4,977,971 A | * | 12/1990 | Crane, III | B25J 5/00 180/8.3 |
| 5,056,038 A | * | 10/1991 | Kuno | B25J 9/1633 700/260 |
| 5,155,423 A | * | 10/1992 | Karlen | B25J 9/04 318/568.1 |
| 5,353,386 A | * | 10/1994 | Kasagami | B25J 9/1682 700/247 |
| 5,737,500 A | * | 4/1998 | Seraji | B25J 9/1643 318/568.11 |
| 5,784,542 A | * | 7/1998 | Ohm | B25J 3/04 700/247 |
| 6,364,888 B1 | * | 4/2002 | Niemeyer | H04N 13/327 13/327 |
| 6,424,885 B1 | * | 7/2002 | Niemeyer | A61B 34/70 600/109 |
| 6,519,860 B1 | * | 2/2003 | Bieg | B23H 7/26 33/1 PT |

(Continued)

FOREIGN PATENT DOCUMENTS

| | | |
|---|---|---|
| JP | 2006-281421 | 10/2006 |
| JP | 2010-228028 | 10/2010 |

*Primary Examiner* — Jonathan L Sample

(74) *Attorney, Agent, or Firm* — Venable LLP

(57) ABSTRACT

A joint of a robot comprises a servo motor, a speed reducer driven by the servo motor, and an output-side encoder for measuring a rotation angle of the output-side rotation shaft of the speed reducer, and the position/orientation of the robot is controlled by the joint. The present invention, which aims to be able to detect certainly and at a high speed the state of the speed reducer, is characterized by driving the joint via the speed reducer by rotating the servo motor, obtaining a resonance amplitude of the joint from the rotation angle obtained from the output-side encoder, and thus diagnosing the lifetime of the speed reducer according to the obtained resonance amplitude of the joint.

20 Claims, 10 Drawing Sheets

(56) References Cited

U.S. PATENT DOCUMENTS

| | | | | |
|---|---|---|---|---|
| 6,766,204 B2* | 7/2004 | Niemeyer | ............ | H04N 13/327 13/327 |
| 6,853,879 B2* | 2/2005 | Sunaoshi | ............... | B25J 9/1689 318/568.11 |
| 8,926,534 B2* | 1/2015 | McBean | ................. | A61F 5/013 601/24 |
| 9,119,655 B2* | 9/2015 | Bowling | ............... | A61B 34/32 |
| 9,868,209 B2* | 1/2018 | Gomi | .................... | B25J 9/1641 |
| 2001/0020199 A1* | 9/2001 | Bacchi | .................... | B25J 9/042 700/245 |
| 2003/0033024 A1* | 2/2003 | Sunaoshi | ............... | B25J 9/1689 700/3 |
| 2003/0060927 A1* | 3/2003 | Gerbi | .................... | G16H 40/63 700/245 |
| 2004/0254680 A1* | 12/2004 | Sunaoshi | ............... | A61B 34/70 700/253 |
| 2006/0161363 A1* | 7/2006 | Shibasaki | ................. | A61B 5/11 702/94 |
| 2006/0241414 A1* | 10/2006 | Nowlin | .................. | A61B 34/70 600/431 |
| 2007/0010913 A1* | 1/2007 | Miyamoto | ............. | B25J 9/1658 700/264 |
| 2007/0296366 A1* | 12/2007 | Quaid | .................... | B25J 9/1638 318/568.16 |
| 2008/0027609 A1* | 1/2008 | Aoki | .................... | B62D 5/0463 701/43 |
| 2008/0075561 A1* | 3/2008 | Takemura | ............... | F16F 1/025 414/2 |
| 2008/0109115 A1* | 5/2008 | Lim | ..................... | B62D 57/032 700/258 |
| 2008/0114494 A1* | 5/2008 | Nixon | .................. | B25J 9/1692 700/254 |
| 2008/0132913 A1* | 6/2008 | Brock | ................. | A61B 17/0469 606/130 |
| 2008/0154246 A1* | 6/2008 | Nowlin | .................. | B25J 9/1689 606/1 |
| 2008/0235970 A1* | 10/2008 | Crampton | .............. | B25J 13/088 33/503 |
| 2009/0000136 A1* | 1/2009 | Crampton | .............. | B25J 13/088 33/503 |
| 2009/0088774 A1* | 4/2009 | Swarup | .................. | A61B 34/37 606/130 |
| 2009/0256615 A1* | 10/2009 | Suzuki | .................. | B41J 11/008 327/298 |
| 2009/0276199 A1* | 11/2009 | Krumme | ................ | A61B 6/56 703/7 |
| 2009/0312844 A1* | 12/2009 | Ikeuchi | ................. | A61H 3/008 623/40 |
| 2010/0079099 A1* | 4/2010 | Katsuki | .............. | G05B 23/0256 318/565 |
| 2010/0130893 A1* | 5/2010 | Sankai | ............... | A63B 21/4047 601/5 |
| 2010/0191374 A1* | 7/2010 | Tsai | ..................... | G05B 19/404 700/258 |
| 2010/0300230 A1* | 12/2010 | Helmer | .................... | B25J 9/106 74/469 |
| 2011/0071675 A1* | 3/2011 | Wells | ................... | G06K 9/3216 700/250 |
| 2011/0118748 A1* | 5/2011 | Itkowitz | ................ | A61B 34/30 606/130 |
| 2011/0201904 A1* | 8/2011 | Cusimano Reaston | .. | A61B 5/00 600/301 |
| 2012/0061155 A1* | 3/2012 | Berger | ..................... | B25J 5/007 180/21 |
| 2013/0245829 A1* | 9/2013 | Ohta | ...................... | B25J 9/1633 700/261 |
| 2014/0060223 A1* | 3/2014 | Tanaka | ....................... | B25J 9/06 74/89 |
| 2014/0067124 A1* | 3/2014 | Williamson | ......... | G05B 19/406 700/258 |
| 2014/0084840 A1* | 3/2014 | Osaka | .................. | G05B 19/404 318/632 |
| 2015/0120049 A1* | 4/2015 | Motoyoshi | ............. | B25J 9/1633 700/258 |
| 2015/0151432 A1* | 6/2015 | Gomi | ..................... | B25J 9/1641 700/258 |
| 2015/0165620 A1* | 6/2015 | Osaka | .................... | B25J 13/088 700/250 |
| 2015/0360369 A1* | 12/2015 | Ishikawa | ............... | B25J 9/1674 29/428 |
| 2016/0008983 A1* | 1/2016 | Osaka | ................... | B25J 9/1692 700/254 |
| 2017/0015004 A1* | 1/2017 | Osaka | .................... | B25J 13/088 |

* cited by examiner

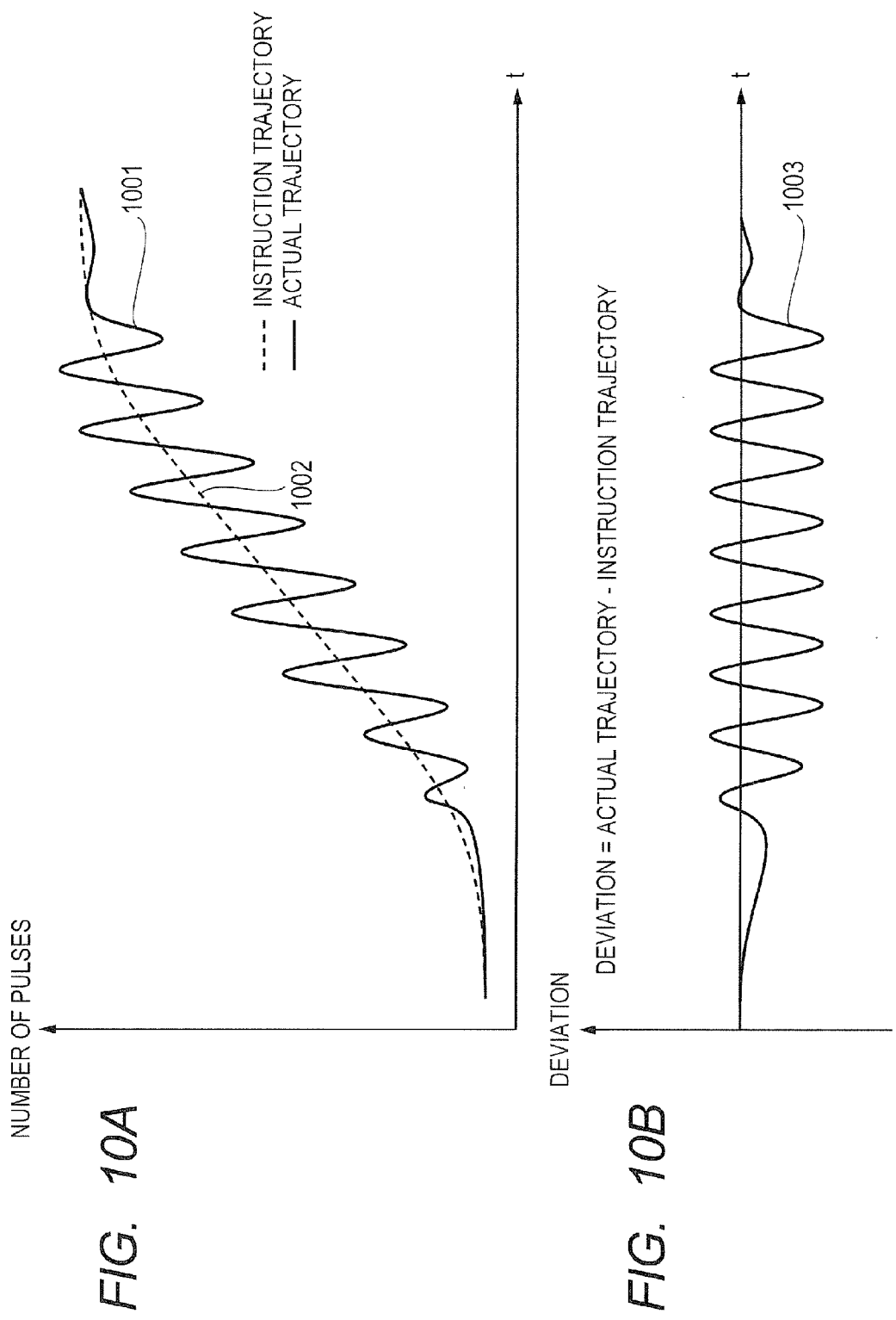

ROTATION DRIVING APPARATUS, ROBOT APPARATUS, CONTROL PROGRAM, AND ARTICLE MANUFACTURING METHOD

BACKGROUND OF THE INVENTION

Field of the Invention

The present invention relates to a rotation driving apparatus which comprises a transmission driven by a rotation driving source, and an output-side sensor for obtaining a rotation angle of the output-side rotation shaft of the transmission, a robot apparatus which uses the rotation driving apparatus, a control program which is used for the rotation driving apparatus, and an article manufacturing method which is performed by the robot apparatus.

Description of the Related Art

In recent years, a producing (manufacturing) apparatus in which a multi-joint robot (simply called a robot hereinafter) is used becomes widespread in the field of industrial manufacturing. Here, the robot comprises, for example, a plurality of joints each driven by a rotation driving apparatus and thus enables to achieve complicated and high-speed article manufacturing work as with human hands. In the robot like this which can perform such complicated operations, since a degree of freedom of the operation by a robot arm is high, there is a possibility that the robot arm comes into contact with another object such as a workpiece, a tool or the like in a surrounding environment while the manufacturing work is being performed. Thus, for example, if the robot arm comes into contact with a peripheral object or the like and thus a transmission (speed reducer) disposed in the joint of the arm is subject to impact, there is a fear that a breakdown (trouble) such as tooth skipping (tripping) or the like occurs in the speed reducer.

Here, an actuator which is used to drive the rotation driving apparatus being the joint of the robot arm of this type is constituted by, for example, a servo motor and a transmission. In general, the transmission of this type is often constituted as a speed reducer because of relation of a rotation speed region of a rotation driving source such as the servo motor and a rotation speed region for rotating a link of the arm. For this reason, in the following, the speed reducer might exemplarily be described as a representative of the transmission to be used in the robot of this type.

As the relevant transmission, a transmission which uses a strain wave gearing mechanism by which a large speed reduction ratio can be obtained as compared with size and shape is widely used. In the transmission (speed reducer) which uses the relevant strain wave gearing mechanism, since angle transmission accuracy of the joint deteriorates due to a breakdown such as tripping or the like, there is a possibility that operation accuracy of the robot arm resultingly deteriorates.

In consideration of such circumstances as above, various techniques related to an interference and a collision of the robot arm are recently proposed. For example, the technique of providing an angle detector at each of the input and output sides of the actuator (motor and transmission) of each joint (each rotation driving apparatus) of the robot arm is proposed (Japanese Patent Application Laid-Open No. 2010-228028). More specifically, in the relevant technique, it is decided based on a detected angle difference between the input and output sides of the actuator whether or not a collision occurs, and, when it is decided that the collision occurs, the robot arm is driven in the reverse direction. Besides, the technique of detecting the state of the actuator (motor and transmission) of the joint after an interference or a collision of the arm occurred is widely known. For example, the technique of detecting a vibration of the arm at the time of driving the actuator of each joint by using a torque variation value calculated based on the motor torque value, comparing such a variation width with a threshold, and, based on the comparison result, deciding whether or not to exchange the necessary part is proposed (Japanese Patent Application Laid-Open No. 2006-281421).

In the technique disclosed in Japanese Patent Application Laid-Open No. 2010-228028, it is possible to detect that contact occurs at the robot arm. However, since it is difficult to visually confirm the transmission externally, it is substantially impossible to know the degree of damage of the transmission occurred by the contact. For this reason, to know or grasp the damage of the transmission, it is necessary to confirm the tooth plane of the gear by dismantling the transmission itself, and then decide whether or not exchange of the part(s) is necessary. Here, when knowing the damage by dismantling the transmission, it is necessary to remove the transmission from the robot arm, and thus there is a problem that it takes a lot of time to do so. On the other hand, in the technique disclosed in Japanese Patent Application Laid-Open No. 2006-281421, since the value to be used for abnormality detection is obtained from the motor torque value, there is a problem that it is impossible to sufficiently obtain high detection accuracy because of the influence of the servo responsiveness of the arm itself.

SUMMARY OF THE INVENTION

The present invention aims to be able to detect accurately and at high speed the state of a transmission which is disposed in, e.g., a joint (rotation driving apparatus) of a robot.

In order to solve such problems as described above, a rotation driving apparatus according to the present invention is characterized by comprising a rotation driving source, a transmission configured to change a rotation speed of an input-side rotation shaft driven by the rotation driving source and drive an output-side rotation shaft, an output-side sensor provided to obtain a rotation angle of the output-side rotation shaft, and a controlling device configured to control the rotation driving source, wherein the controlling device comprises a unit configured to obtain a resonance amplitude of a joint from a value of the output-side sensor.

According to such a constitution as described above, it is possible to detect the state of the transmission disposed in the joint of the robot accurately and swiftly, in accordance with the resonance amplitude of the joint measured via the output-side sensor of measuring the rotation angle of the output-side rotation shaft of the transmission. For this reason, there is a significant effect that it is possible to swiftly perform part exchange decision of the robot, and it is thus possible to maintain the joint (transmission) of the robot in an appropriate state.

Further features of the present invention will become apparent from the following description of exemplary embodiments with reference to the attached drawings.

BRIEF DESCRIPTION OF THE DRAWINGS

FIG. 10A is a waveform diagram for indicating a pulse waveform of a position signal obtained from an encoder disposed in the joint of the robot arm.

FIG. 10B is a waveform diagram for indicating a pulse waveform of the position signal obtained by eliminating an instruction operation component from the waveform illustrated in FIG. 10A.

DESCRIPTION OF THE EMBODIMENTS

Figure 1:
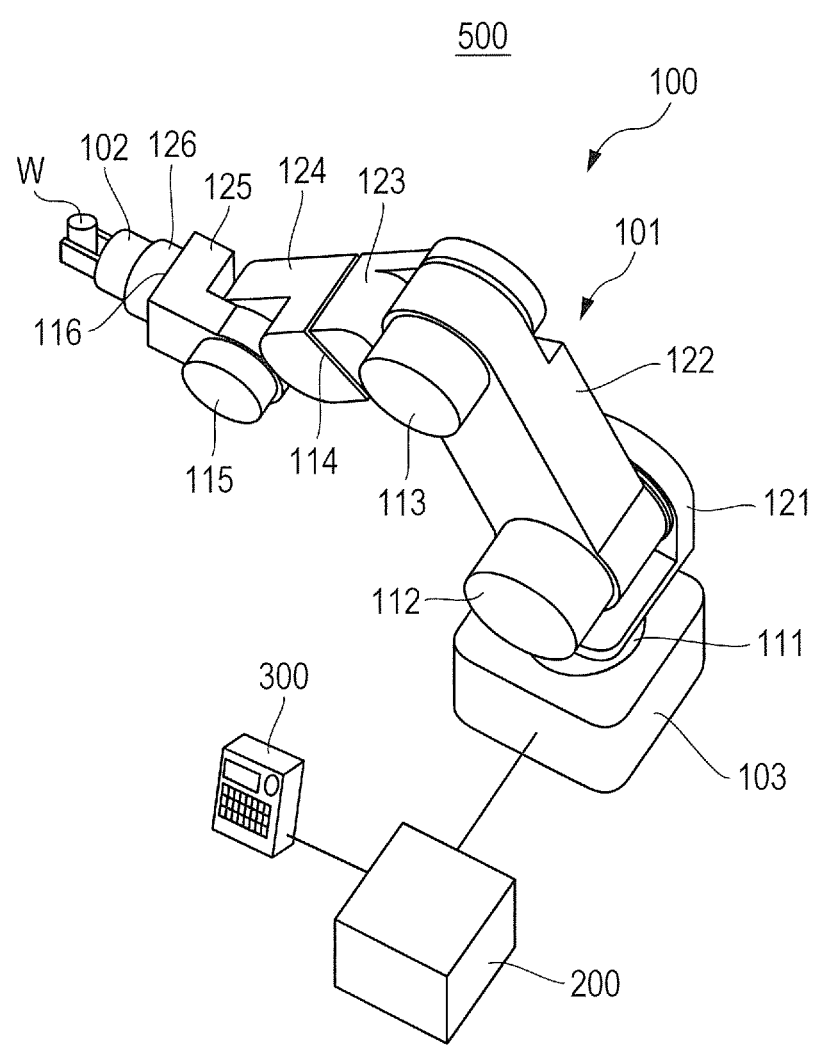
FIG. 1 is a perspective diagram for illustrating the entire constitution of a robot apparatus according to the embodiment of the present invention.

Preferred embodiments of the present invention will now be described in detail in accordance with the accompanying drawings. Incidentally, the embodiment described below is merely an example. Therefore, for example, a person skilled in the art can appropriately change or modify the detailed constitution within the range not departing from the scope of the present invention. Besides, since the numerical values used in the embodiment of the present invention are merely reference numerical values, it is apparent that these values do not limit or restrict the present invention.

A robot apparatus according to the present embodiment is an industrial robot apparatus which performs assembling operation and work, and comprises a function for detecting a deterioration state, particularly a trouble (failure), of a transmission of the robot apparatus and preventing the trouble of the transmission. In other words, the robot apparatus comprises the function capable of diagnosing the state thereof. The trouble in the present embodiment includes a state that the transmission cannot be used, and also includes a normal-use disabled state that the transmission cannot be used for normal use. For example, the normal-use disabled state includes a state which exceeds an acceptable range (i.e., a normally usable state) to a use condition required for a predetermined use.

As described above, for example, the transmission of a rotation driving apparatus which is equivalent to the joint of the robot apparatus is often constituted generally as a speed reducer because of relation between a rotation speed region of a rotation driving source such as a servo motor and a rotation speed region for rotating a link of an arm. For this reason, in the following, the speed reducer will be described exemplarily as the representative of the transmission to be used in the robot apparatus of this type.

In the present embodiment, the (deterioration) state of the transmission which particularly uses a strain wave gearing mechanism is diagnosed via a resonance phenomenon which occurs in the rotation driving apparatus which is the joint unit of the robot apparatus. Here, the operation of detecting the deterioration state of the transmission of the joint unit via the resonance phenomenon of the joint unit (rotation driving apparatus) of the robot apparatus is based on a principle as described below. Incidentally, in the specification of this application, the rotation driving apparatus might be called the joint.

When a damage occurs in the speed reducer due to such buffer action, collision or the like as above, an angle transmission error occurs due to tooth skipping, catching of a fragment caused by the damage, or the like. For example, the relevant angle transmission error is equivalent to an error which occurs between an input angle on the primary side of the speed reducer and an output angle obtained on the secondary side of the speed reducer via a change speed ratio.

On the other hand, a resonance frequency f (Hz: character frequency) as indicated by the following expression (1) exists in the joint of the robot in which the speed reducer using the strain wave gearing mechanism is used.

$$f = \frac{1}{2\pi}\sqrt{\frac{K}{J}} \quad (1)$$

Here, "f" indicates the resonance frequency (Hz: character frequency) of the vibration system which includes the speed reducer, "K" indicates a spring constant of the speed reducer, and "J" indicates a load inertia (Kgm²) of the load which is driven by the joint in which the speed reducer is provided. The spring constant K is a constant term, and this constant is inherent for each type of the speed reducer. Further, the load inertia J corresponds to an inertia moment which is applied to the target joint shaft, and the magnitude thereof changes according to the orientation of a robot arm.

Besides, the speed reducer is equivalent to a rotation driving system, and corresponds to the number of rotations R (rmp: the number of rotations per one minute) as indicated by the following expression (2).

$$R = \frac{f}{2} * 60 \quad (2)$$

Accordingly, when the rotation speed of the input side of the speed reducer reaches the number of rotations R which satisfies the expression (2), a resonance phenomenon occurs in the joint. That is, when the relevant joint is driven, speed unevenness which coincides with the above resonance frequency f occurs in the vicinity of the number of driving rotations indicated by the expression (2).

It should be noted that the magnitude of the angle transmission error of the speed reducer and the magnitude of the resonance are related to each other. For example, it is assumed that a tooth fragment of the speed reducer gear which was chipped due to an abrupt overload such as collision or the like is periodically caught by another tooth. In such a case, if the angle transmission error which occurs due to the above accidental catching of the tooth fragment coincides with the resonance frequency, the arm largely resonates as compared with the normal state. Besides, even in a case where there is no damage in the gear, if (the whole of) the speed reducer has been distorted elliptically, a wave generator which is one of the parts constituting the strain wave gearing mechanism of the speed reducer is periodically deformed, whereby the arm largely resonates likewise.

As described above, in the resonance phenomenon which occurs in the joint of the robot, it is conceivable that the angle transmission error of the speed reducer appears in a form of vibration of the joint which can be detected by an output-side encoder. For this reason, it is possible to diagnose the speed reducer by measuring the intensity, e.g., the amplitude, of the resonance which occurs in (the speed reducer of) the joint of the robot arm, and comparing the relevant resonance amplitude with a reference value previously determined as an index (rough indication) value according to the angle transmission error.

Hereinafter, the measurement and the diagnosis which are performed to the joint of the robot apparatus based on the above principles will concretely be described with reference to the embodiment described with FIGS. 1 to 10B.

Embodiment

Figure 2:
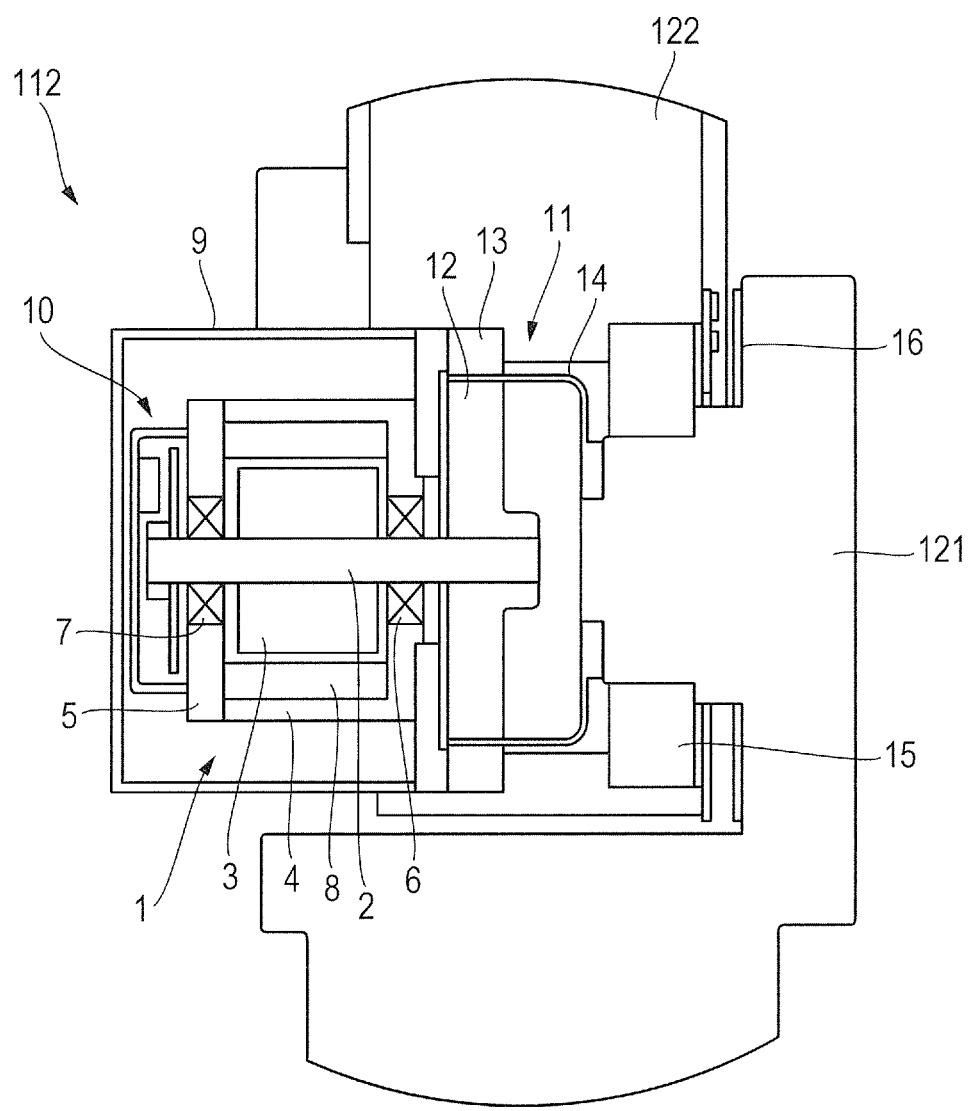
FIG. 2 is a section diagram for illustrating the constitution in the vicinity of a joint of the robot apparatus illustrated in FIG. 1.
Figure 3:
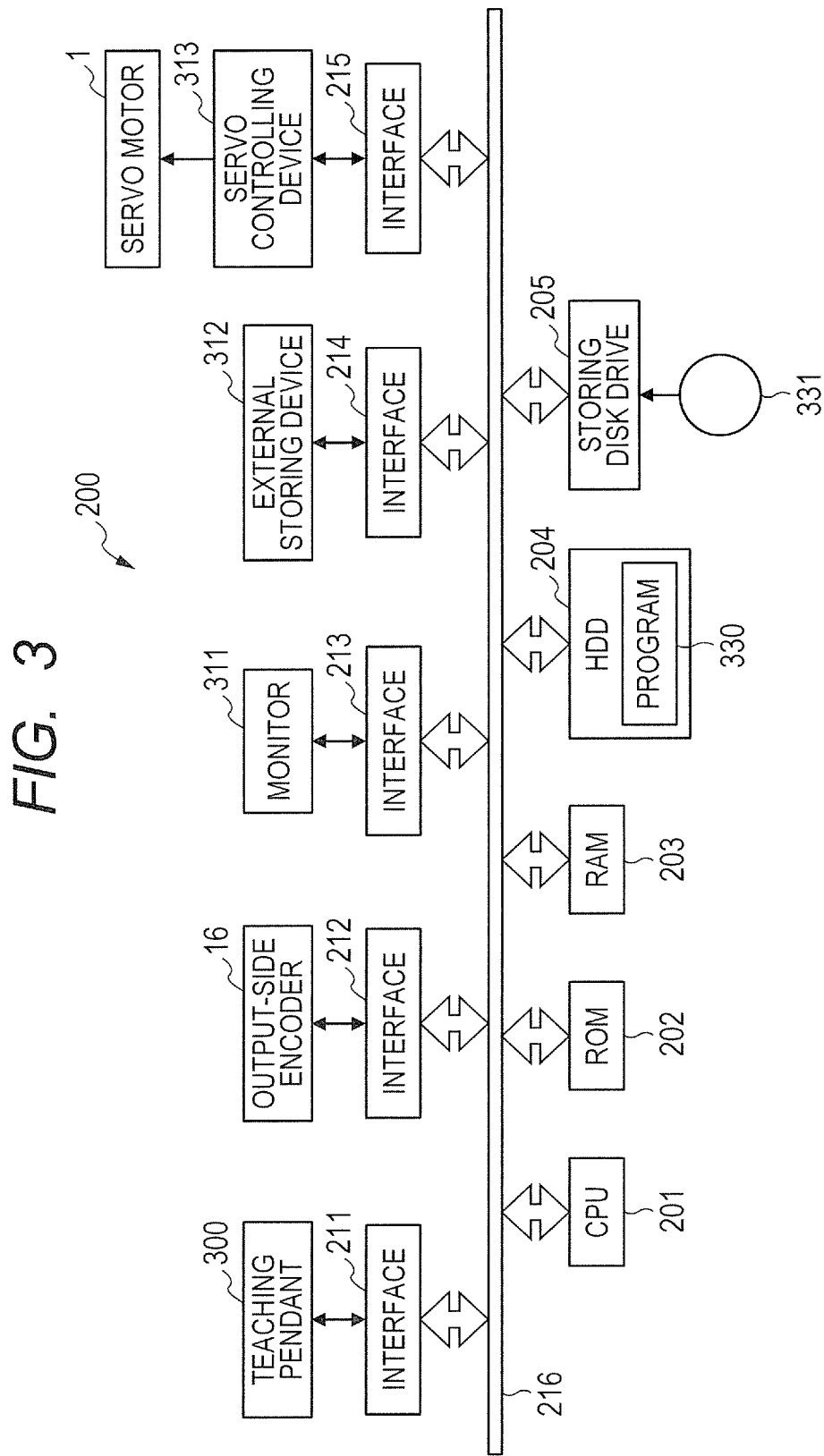
FIG. 3 is a block diagram for illustrating the constitution of a controlling device of the robot apparatus illustrated in FIG. 2.

FIGS. 1 to 3 are the diagrams for illustrating an example of the constitution of a robot apparatus 500 to which the present invention can be carried out. More specifically, FIG. 1 is the diagram for schematically illustrating the entire constitution of the robot apparatus 500, FIG. 2 is the diagram for illustrating the section diagram of the constitution in the vicinity of one joint of the robot apparatus 500 of FIG. 1, and FIG. 3 is the diagram for illustrating the constitution of a controlling device 200 of the robot apparatus 500 of FIG. 1.

As illustrated in FIG. 1, the robot apparatus 500 comprises a robot 100 which assembles a workpiece W, the controlling device 200 which controls the robot 100, and a teaching pendant 300 which is connected to the controlling device 200. Besides, the controlling device 200 comprises a displaying unit (not illustrated) such as a monitor or the like.

The robot 100 comprises a six-shaft multi-joint robot arm 101, a hand (end effector) 102 which is connected to the tip of the robot arm 101, and a force sensor (not illustrated) which can detect force or the like acting on the hand 102.

The robot arm 101 comprises a base unit (base) 103 which is fixed to a working table, a plurality of links 121 to 126 which are used to transmit displacement and force, and a plurality of joints 111 to 116 which are used to connect together the respective links 121 to 126 revolvably or rotatably. In the present embodiment, the constitution of each of the plurality of joints 111 to 116 is basically identical to others. For this reason, in the following, the constitution of the joint 112 between the link 121 and the link 122 will be described as a representative of the constitution which is common to the joints 111 to 116, whereby the concrete descriptions for the joints 111 and 113 to 116 will be omitted. Incidentally, on the condition that the joint of which the constitution is the same as that of the joint 112 is provided for at least one of the plurality of joints 111 to 116 of the robot arm 101, the present embodiment can be carried out.

A rotation driving apparatus comprises a rotation driving source, a transmission configured to change a rotation speed of an input-side rotation shaft driven by the rotation driving source and drive an output-side rotation shaft, an output-side sensor provided to obtain a rotation angle of the output-side rotation shaft, and a controlling device configured to control the rotation driving source.

As illustrated in FIG. 2, the joint 112 (rotation driving apparatus) comprises a servo motor (motor) 1 which acts as the rotation driving source, and a speed reducer 11 (transmission) which reduces (changes) the rotation speed of the input-side rotation shaft driven by the servo motor 1. The rotation angle (output-side rotation angle) of the output side of the speed reducer 11 of the joint 112 is detected by an output-side encoder 16 (rotary encoder). Each of the output-side encoder 16 and a later-described input-side encoder 10 has the constitution same as that of a general rotary encoder, and is constituted by an optical or magnetic rotary encoder device.

For example, the servo motor 1 can be constituted by an electromagnetic motor such as a brushless DC (direct current) motor, an AC (alternating current) servo motor or the like. The servo motor 1 comprises a rotation unit 4 which is constituted by a rotation shaft 2 and a rotor magnet 3, a motor housing 5, bearings 6 and 7 which rotatably support the rotation shaft 2, and a stator coil 8 which rotates the rotation unit 4. The bearings 6 and 7 are provided in the motor housing 5, and the stator coil 8 is attached to the motor housing 5. The servo motor 1 is surrounded by a motor cover 9. Incidentally, in the servo motor 1, it may be possible to provide a brake unit which is used to hold the orientation of the robot arm 101 at the time when the power supply thereof is OFF, according to necessity.

The speed reducer 11 comprises a wave generator which serves as an input unit, a circular spline 13 which serves as an output unit, and a flex spline 14 which is disposed between the wave generator 12 and the circular spline 13. The wave generator 12 is connected to the other end side of the rotation shaft 2 of the servo motor 1. The circular spline 13 is connected to the link 122, and the flex spline 14 is connected to the link 121. That is, the connection portion of the rotation shaft 2 of the servo motor 1 and the wave generator 12 is equivalent to the input side of the speed reducer 11, and the connection portion of the flex spline 14 and the link 121 is equivalent to the output side of the speed reducer 11. The rotation speed of the rotation shaft 2 of the servo motor 1 is reduced to 1/N via the speed reducer 11 (that is, the speed is reduced at a speed reduction ratio N), whereby the link 121 and the link 122 are relatively rotated. The rotation angle of the output side of the speed reducer 11 at this time is equivalent to the actual output angle, i.e., the angle of the joint 112.

The output-side encoder (output-side angle sensor) 16 is provided on the output side of the speed reducer 11, and detects the relative angle between the link 121 and the link 122. More specifically, the output-side encoder 16 generates an output-side pulse signal in accordance with driving of the joint 112 (that is, the relative movement of the link 121 and the link 122), and outputs the generated output-side pulse signal to the controlling device 200. A cross roller bearing 15 is provided between the link 121 and the link 122, whereby the link 121 and the link 122 are rotatably connected to each other via the cross roller bearing 15. Incidentally, in the specification of this application, the output-side angle sensor might be simply called an output-side sensor.

The input-side encoder (input-side angle sensor) 10 can be disposed on the input side of the rotation shaft of the servo motor 1, i.e., the speed reducer 11. Incidentally, in the specification of this application, the input-side angle sensor might be simply called an input-side sensor.

The hand 102 comprises a plurality of fingers which can grasp the workpiece W, and a not-illustrated actuator which drives each of the plurality of fingers. That is, the hand can grasp or hold the workpiece by driving the plurality of fingers. The force sensor detects the force and the moment acting on the hand 102 when the hand 102 grasps the workpiece W by the plurality of fingers.

As illustrated in FIG. 3, the controlling device 200 comprises a CPU (central processing unit) 201, a ROM (read only memory) 202, a RAM (random access memory) 203, an HDD (hard disk drive) (storing unit) 204, a recording disk drive 205, and various interfaces 211 to 215.

The ROM 202, the RAM 203, the HDD 204, the recording disk drive 205 and the various interfaces 211 to 215 are connected to the CPU 201 via a bus 216. The ROM 202 has stored therein basic programs such as a BIOS (basic input/output system) and the like. The RAM 203 constitutes a storing area which temporarily stores therein results of arithmetic operations and calculations by the CPU 201.

The HDD 204 serves as a storing unit which stores therein various data and the like being the results of the arithmetic operations and calculations by the CPU 201. Also, the HDD records therein a control program 330 (including, e.g., later-described diagnosis program) to be used for causing the CPU 201 to perform the various arithmetic operations and calculations. The CPU 201 performs the various arithmetic operations and calculations based on the control program recorded (stored) in the HDD 204. The recording disk drive 205 can read various data, various programs and the like recorded in a storing disk 331.

In particular, the control program 330 which corresponds to a later-described control procedure to be executed by the computer (CPU 201) is stored in, e.g., the HDD 204 (or ROM 202) illustrated in FIG. 3. The storing unit such as the ROM 202 or the HDD 204 constitutes a computer-readable recording medium. Besides, (a part of) the computer-readable recording medium such as the ROM 202 or the HDD 204 may be constituted by a detachable flash memory device, a magnetic/optical disk or the like. Besides, the program which corresponds to the later-described control procedure to be executed by the computer (CPU 201) may be downloaded via a network or the like, and introduced and stored in, e.g., the HDD 204 or the like. Alternatively, the software which has been stored in the HDD or the like may be updated by the newly downloaded program.

The teaching pendant 300 which is operated by a user is connected to the interface 211. The teaching pendant 300 comprises a user interface which consists of a displaying device such as an LCD (liquid crystal display) panel or the like, a keyboard and the like. The user can perform a teaching operation for the robot 100 by using the relevant user interface. Thus, for example, it is possible to designate the position orientation (teaching point) of the reference point set at the hand tip or the like of the robot arm 101, and designate the joint angle of each of the joints 111 to 116. The teaching pendant 300 outputs a target joint angle of each of the joints 111 to 116 input like this to the CPU 201 via the interface 211 and the bus 216.

The output-side encoder 16 of each of the joints 111 to 116 of the robot arm 101 is connected to the interface 212. As described above, the output-side encoder outputs the pulse signal corresponding to the joint angle to the CPU 201 via the interface 212 and the bus 216. Further, a monitor 311 and an external storing device 312 (rewritable non-volatile memory, external HDD, etc.) can be connected respectively to the interfaces 213 and 214. The monitor 311 is, e.g., a displaying device such as an LCD panel or the like. The monitor can be used to perform monitor display of the control state of the robot 100, and also used to display information related to a later-described diagnosing process, a warning message and the like.

A servo controlling device 313 is connected to the interface 215. The CPU 201 outputs data of a driving instruction which indicates a control amount of the rotation angle of the rotation shaft 2 of the servo motor 1 to the servo controlling device 313 at a predetermined interval via the bus 216 and the interface 215.

The servo controlling device 313 calculates an output amount of the current to be supplied to the servo motor 1 of each of the joints 111 to 116 of the robot arm 101, based on the driving instruction input from the CPU 201. The servo controlling device 313 supplies the current corresponding to an obtained current value to the servo motor 1, thereby controlling the joint angles of the joints 111 to 116 of the robot arm 101. That is, the CPU 201 can control the driving of the joints 111 to 116 by the servo motor 1 such that each of the angles of the joints 111 to 116 becomes the target joint angle via the servo controlling device 313.

Figure 4:
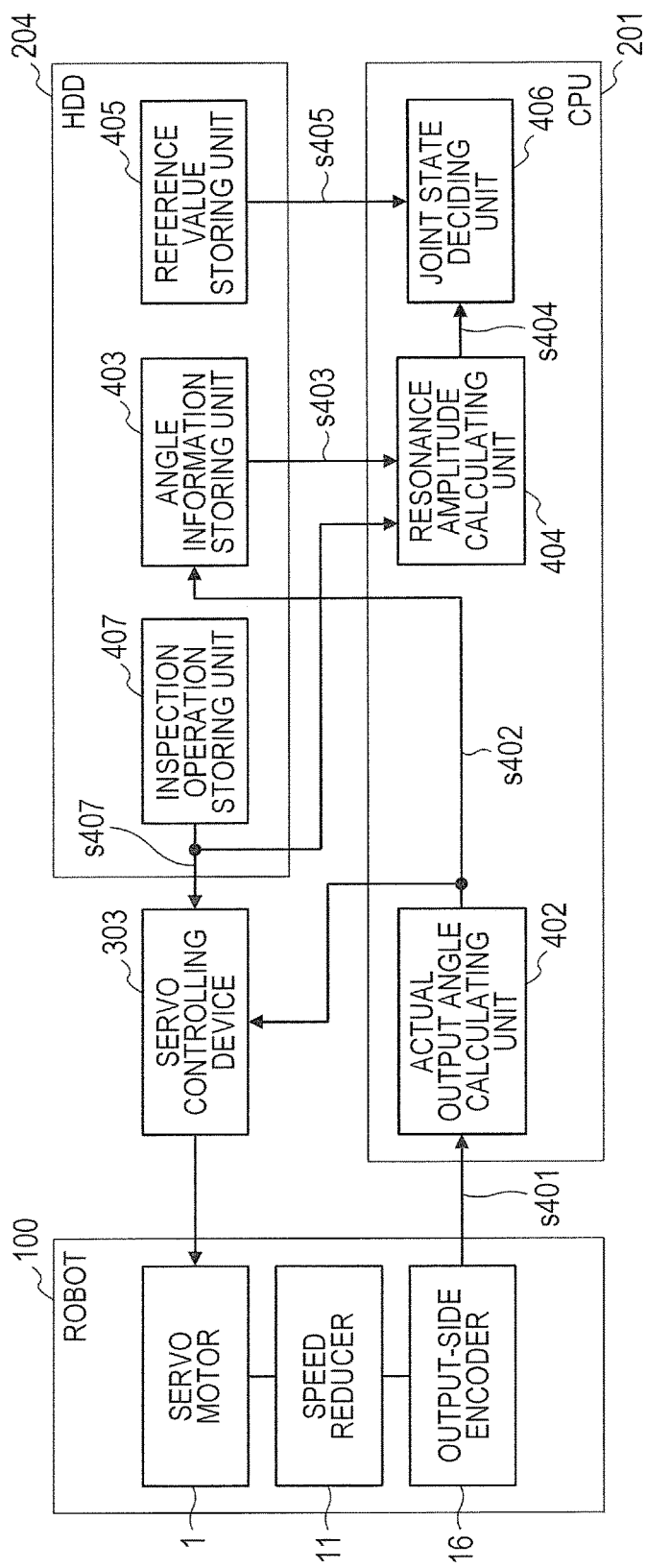
FIG. 4 is a block diagram for illustrating the functional constitution of the controlling device of the robot apparatus illustrated in FIG. 2.

Here, the function to be performed by the controlling device 200 when executing a diagnosis program according to the present embodiment (e.g., FIG. 5 later described) will be described with reference to FIG. 4. Each function block illustrated in FIG. 4 is implemented by the hardware of a computer (CPU 201) and the software thereof. In particular, the software portion thereof is stored in a computer-readable recording medium such as the ROM 202, the HDD 204 or the like.

The function constitution illustrated in FIG. 4 includes an actual output angle calculating unit 402, a resonance amplitude calculating unit 404 which calculates the angle transmission error caused by the resonance from the rotation angle, and a joint state deciding unit 406. Moreover, the function constitution illustrated in FIG. 4 includes a reference value storing unit 405 which stores therein the amplitude to be used for diagnosing the speed reducer 11 of the joint, an angle information storing unit 403 which stores and accumulates therein the output-side rotation angle detected by the output-side encoder 16, and an inspection operation storing unit 407 which stores therein operations for inspection.

The actual output angle calculating unit 402 obtains the output-side rotation angle (actual output angle information) (s402) by counting the output-side pulse signals (s401) received from the output-side encoder 16, and outputs the obtained output-side rotation angle to a servo controlling device 303 and the angle information storing unit 403. Based on inspection operation information s407 stored in the inspection operation storing unit 407, the servo controlling device 303 performs joint angle control of the servo motor 1 by referring to the actual output angle information (s402) output from the actual output angle calculating unit 402.

The inspection operation information s407 is used to define the inspection operation at the time of diagnosing the joint. Since the characteristics indicated by the expressions (1) and (2) are different for each of the joints (111 to 116), the content of the inspection operation information s407 is different for each of the joints (111 to 116) to be diagnosed. In particular, the inspection operation information s407 corresponds to the character frequency of joint in the specific orientation of the target joint in a resonance amplitude obtaining step, and is used to define the inspection operation to drive the joint within the speed range including the rotation speed at which the highest resonance of the joint occurs.

Besides, as later described in a control example (FIG. 5), it is possible to constitute the inspection operation information s407 so as to be able to obtain the resonance amplitudes by stepwise changing the rotation speed of the joint within the above speed range. Namely, the maximum resonance amplitude is obtained from the resonance amplitudes respectively obtained from the plurality of rotation speeds. For example, it is possible to obtain, as the resonance amplitude, the maximum value of the oscillation of the frequency component centering on the resonance frequency corresponding to the character frequency of joint in the specific orientation of the joint. Then, it is possible to set the obtained maximum value as the resonance frequency, compare the relevant resonance frequency with a reference value, and, based on the comparison result, perform diagnosis of the joint.

The angle information storing unit 403 accumulates the the actual output angle information (s402) output from the actual output angle calculating unit 402. The reference value storing unit 405 stores a decision reference value s405 which is necessary for decision, and outputs the stored decision reference value to the joint state deciding unit 406. The resonance amplitude calculating unit 404 reads out angle information s403 accumulated in the angle information storing unit 403, calculates a decision value A (s404) which is necessary for inspection, and outputs the calculated decision value A to the joint state deciding unit 406. The joint state deciding unit 406 compares the decision reference value s405 output from the reference value storing unit 405 with the decision value A (s404) calculated by the resonance amplitude calculating unit 404, and decides the angle state of the robot based on the comparison result.

Subsequently, the diagnosing process for the joints (111 to 116) to be performed by means of the above-described constitution will be described with reference to FIG. 5. Namely, FIG. 5 indicates the flow of the diagnosing process (diagnosis mode) for the joints (111 to 116) to be performed under the control of the controlling device 200, particularly the CPU 201, in the above-described constitution according to the present embodiment.

In the present embodiment, as described above, the state of the target joint is diagnosed by using the resonance phenomenon which occurs at the frequency centering on the resonance frequency corresponding to the character frequency of joint in the specific orientation of the relevant joint.

Here, it is possible to perform the diagnosing process (diagnosis mode) described with reference to FIG. 5 at a time of periodic inspection of the robot, and after events such as unintended interference, collision and the like occurred. As an opportunity to perform the diagnosing process (diagnosis mode) of FIG. 5, for example, an operation that an operator selects the diagnosis mode by using the user interface such as the teaching pendant 300 or the like is conceivable.

Figure 5:
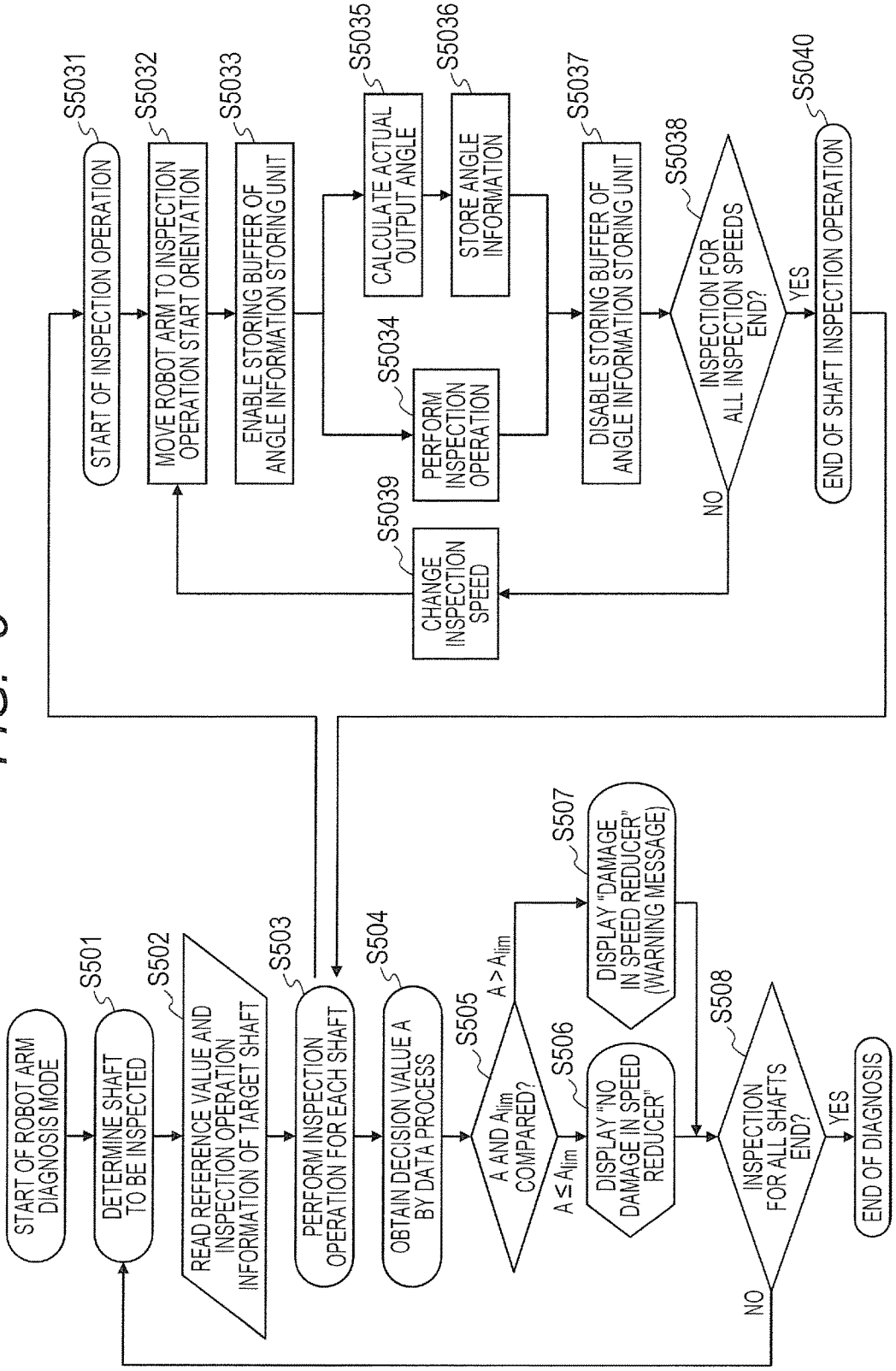
FIG. 5 is a flow chart for describing a control procedure related to inspection for the robot apparatus illustrated in FIG. 1.

The diagnosing process (diagnosis mode) of FIG. 5 is performed for each of the shafts of the joints (111 to 116). When the diagnosing process (diagnosis mode) is selected by the operator (user), the shaft to be inspected is determined in S501 of FIG. 5. Although the diagnosing process (diagnosis mode) of FIG. 5 is configured to perform from a specific shaft (joint) to all shafts (all joints), it may be controlled to perform the diagnosing process only to a single shaft, or perform the diagnosing process only to a single or a plurality of shafts designated by the operator (user). Usually, it is desirable to perform the inspection (diagnosing process) for all the shafts (all the joints). It may be possible to inspect the joints in order closer to the base unit 103, or in arbitrary order designated by the user.

Next, in S502, the decision reference value s405 and the inspection operation information s407 for the inspection-target shaft are read respectively from the reference value storing unit 405 and the inspection operation storing unit 407. The reference value storing unit 405 and the inspection operation storing unit 407 can be previously disposed in the form of data files or the like in, e.g., the HDD 204 or the like. The decision reference value s405 and the inspection operation information s407 are different for each of the joints (111 to 116) to be inspected, because, for example, the characteristics indicated by the expressions (1) and (2) are different for each of the joints (111 to 116). Therefore, the decision reference value s405 and the inspection operation information s407 are prepared respectively in the reference value storing unit 405 and the inspection operation storing unit 407 for each shaft (inertia), and then the information corresponding to the joint to be inspected is individually read and supplied into the working area such as the RAM 203 or the like when the inspection is actually performed. Alternatively, the reference values and the inspection operations for all the shafts may be read and supplied in a lump into the working area such as the RAM 203 or the like when the diagnosis mode is selected.

In S503, the inspection operation for the relevant joint (shaft) is performed. That is, the servo controlling device 303 drives the shaft to be inspected, in accordance with the inspection operation information s407 read in S502. At this time, the pulse signals (values) (s401) obtained from the output-side encoder 16 are counted by the actual output angle calculating unit 402 for a certain period, and the values (s402) obtained by converting the pulse values into the actual output angle information are stored and accumulated in the angle information storing unit 403.

The process for the inspection operation in S503 is indicated in detail in the right column of FIG. 5 as S5031 to S5040. Hereinafter, the process in S5031 to S5040 which constitute the process of S503 will be described in detail.

When the inspection operation is started in S5031, then in S5032, the servo controlling device 303 moves the robot arm 101 to the start orientation based on the inspection operation information s407 read in S502.

Next, in S5033, the angle information storing unit 403 is enabled to store and accumulate the actual output angle information (s402), and the storing buffer is enabled to store the actual output angle information (s402) output from the actual output angle calculating unit 402.

Subsequently, in S5034, the servo controlling device 303 drives the target joint in a specific operation pattern according to the inspection operation information s407 read in S502. During such driving, the pulse values (s401) obtained from the output-side encoder are sequentially converted into the actual output angle information (s402) by the actual output angle calculating unit 402 (S5035), and then stored and accumulated in the angle information storing unit 403 (S5036).

When the inspection operation ends, then in S5037, the storing buffer of the angle information storing unit 403 is closed (disabled), and the actual output angle information (s402) is stored.

As described above, the inspection operation information s407 corresponds to the character frequency of joint in the specific orientation of the target joint, and is driven by changing the rotation speed stepwise within the speed range including the rotation speed at which the strongest resonance of the joint occurs.

Thus, in S5038, it is decided whether or not the inspection has been performed for all the inspection speeds defined by the inspection operation information s407. When it is decided in S5038 that the speed for which the inspection is not performed yet exists, the speed is changed to the relevant speed for which the inspection is not performed yet in S5039, and then the process is returned to S5032 to repeatedly perform the above processes. On the other hand, when it is decided that the inspection ended for all the inspection speeds defined by the inspection operation information s407, the inspection of the relevant joint ends in S5040, and then the process is advanced to S504 (left column of FIG. 5). Incidentally, it is desirable to set the interval, for which the pulse value (s401) is read from the output-side encoder 16, to the obtained period which coincides with the control period of the servo controlling device 303, whereby it is possible to reduce the operation load in S504.

In S504, the actual output angle information (s402) accumulated in the angle information storing unit 403 in S503 is processed, and the oscillation width of the angle due to the resonance is calculated as the decision value A (s404).

The processes in S505 to S507 correspond to the diagnosing step of diagnosing the state of the speed reducer 11. Initially, in S505, the decision value A (s404) calculated in S504 is compared with a reference value $A_{lim}$ (s405) read in S502. When the decision value A (s404) exceeds the reference value $A_{lim}$ (s405), it is decided that the the speed reducer 11 of the inspected shaft has been damaged. In accordance with the judged result, "no damage in speed reducer" is output in S506 or "damage in speed reducer" (warning message) is output in S507. Such diagnosis messages are output by using the display of, e.g., the monitor 311 or the teaching pendant 300. In addition, it may be possible to output the message by means of audio output or the like with use of an audio outputting unit (not illustrated).

When the process in S505 ends, it is confirmed in S506 whether or not the joint (shaft) which is not inspected yet remains. In S508, when the joint (shaft) which is not inspected yet remains, the process is returned to S501 to repeatedly perform the above processes. Thus, the inspection is performed for all the inspection-target joints (shafts).

As just described, it is possible to perform the diagnosing process (diagnosis mode) as in FIG. 5 for each joint. In the diagnosing process (diagnosis mode) as in FIG. 5, the resonance amplitude obtaining step is performed for each specific inspection-target joint. At that time, the inspection operation information s407 to be used corresponds to the character frequency of joint in the specific orientation of the target joint, and is used to define the inspection operation of driving the joint within the speed range including the rotation speed at which the strongest resonance of the joint occurs. The character frequency of joint can previously be calculated by the expression (1). Moreover, the speed range which includes the rotation speed at which the strongest resonance of the joint occurs can previously be determined by the expression (2).

Therefore, by performing the diagnosing process (diagnosis mode) as indicated with reference to FIG. 5 for each joint, it is possible to obtain the decision value A of the resonance frequency of the relevant joint. For example, the decision value A of the resonance amplitude can be calculated as the maximum value of the oscillation of the frequency component centering on the resonance frequency. Thus, by comparing the decision value A with the reference value $A_{lim}$ (s405) set for each joint as well as the inspection operation information s407, it is possible to diagnose the relevant joint, for example, it is possible to diagnose whether or not the joint has been damaged (or whether or not the joint has exceeded its lifetime). Then, it is possible to notify the user of the diagnosis result by outputting a display message (or voice message). For example, it is possible to output such a diagnosis result message by means of display output with use of the monitor 311, the display of the teaching pendant 300 or the like, or voice output with use of an audio output unit (not illustrated).

The outline of the diagnosing process (diagnosis mode) according to the present embodiment has been described with reference to FIG. 5. Incidentally, the detail of robot control to be performed in the above diagnosing process (diagnosis mode) will be further argued in the following.

As apparent from the expressions (1) and (2), the aspect of resonance of the robot joint portion which is occurred in the inspection is influenced by two factors, i.e., the orientation of the robot arm and the operation (driving) speed of the joint. That is, when the orientation of the robot arm 101 in the inspection differs, the magnitude of the load inertia in the expression (1) changes. Besides, when it intends to perform the diagnosis via the resonance phenomenon, it is of course necessary to select, as the driving speed of the joint, a speed (range) which is defined by the expression (2).

Figure 6:
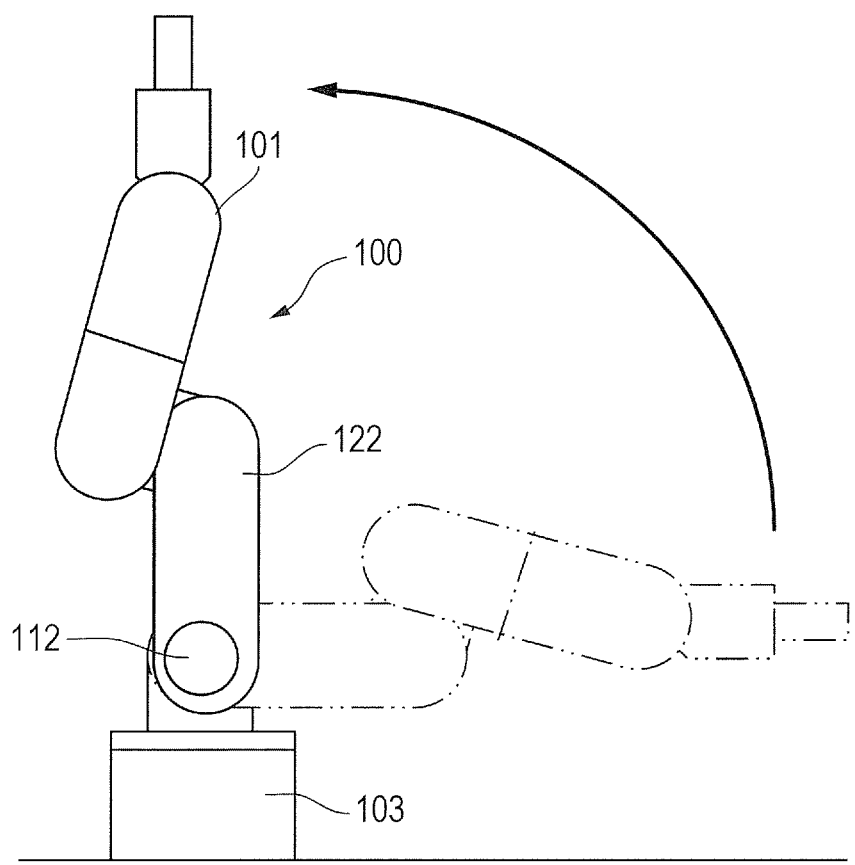
FIG. 6 is a diagram for describing orientations of a robot arm to be used in the inspection for the robot apparatus illustrated in FIG. 1.

Here, a desirable orientation of the robot arm 101 in the inspection operation which is performed in S503 of FIG. 5 by using the resonance of the joint will be considered with reference to FIG. 6. FIG. 6 is the diagram for describing an example of the predetermined orientation of the robot arm at the time when the inspection operation is performed in the present embodiment.

The inspection operation according to the present embodiment, that is, the inspection operation which is defined for each joint based on the inspection operation information s407, is characterized by performing the predetermined operation of intentionally causing the resonance in the predetermined orientation. As such the inspection operation, it is possible to set one operation or a plurality of different operations to a one joint. Here, when the plurality of different operations are set, for example, a same inspection (initial) orientation and a same operation mode are used. Also, an inspection operation of making only the driving speed of the relevant joint different (making the plurality of different driving speeds) and then measuring these driving speeds is conceivable.

Here, such the predetermined inspection (initial) orientation can arbitrarily be set. However, ideally, it is desirable to set the orientation (maximum moment orientation) by which the maximum inertia moment acts on the inspection-target joint. That is, if the orientation which corresponds to the large inertia moment is used, the resonance frequency becomes small, whereby it becomes possible to easily obtain the resonance phenomenon of the joint.

FIG. 6 is the diagram for illustrating an example of the maximum moment orientation of the joint 112 which drives the link 122. In the example of FIG. 6, the center of gravity of the frame at the portion which precedes the joint 112 is farthest from the joint 112 in the orientation (alternate long and two short dash line) that the robot 100 maximally extends the arm thereof in the horizontal direction. For this reason, in the orientation (alternate long and two short dash line) that the robot maximally extends the arm thereof in the horizontal direction, the inertia moment (load inertia J in the expression (1)) which acts on the joint 112 becomes maximum. Then, for example, the orientation (alternate long and two short dash line) that the robot maximally extends the arm in the horizontal direction is set as the inspection initial orientation, and the joint 112 is driven at different speeds within the speed range centering on the resonance frequency corresponding to the character frequency, until the orientation becomes the orientation that the portion which precedes the link 122 stands upright as indicated by the arrow. By the inspection operation like this, the resonance frequency f is lowered from the expression (1), whereby it becomes possible to easily seize the resonance phenomenon via the output-side encoder 16. Likewise, it is possible to previously obtain the maximum moment orientation independently for each of the remaining joints, and determine the inspection (initial) orientation and the driving mode (inspection operation information s407) of the relevant joint.

Besides, it is desirable for the predetermined inspection operation to satisfy the following condition. For example, an interval during which the target joint operates at a constant inspection speed exists, and the relevant interval corresponds to one or more rotations of the input side of the speed reducer. Here, it is assumed that the inspection speed is equivalent to a settable (controllable) joint driving speed which is closest to the number R of motor rotations satisfying the conditions of the expressions (1) and (2) in a predetermined orientation. Besides, it is desirable to perform the measurement including the plurality of different speeds, within the speed range W centering on the motor rotation speed (R).

This is because there is a case where the actually occurred resonance frequency is slightly deviated from the resonance frequency previously calculated using the expression (1), due to a slight difference (control error) of the orientations, a secular change, and other various factors. Although the speed step at this time can arbitrarily be set, it is desirable to set the width thereof to the minimum width capable of being set by the controlling device 200. As just described, by performing the measurement for the joint by using the different inspection speeds within the speed range W including the driving speed corresponding to the resonance frequency corresponding to the previously calculated character frequency, it is possible to surely or certainly diagnose the state of the relevant joint via the resonance phenomenon even if the control error, the secular change or the like occurs.

Figure 7A:
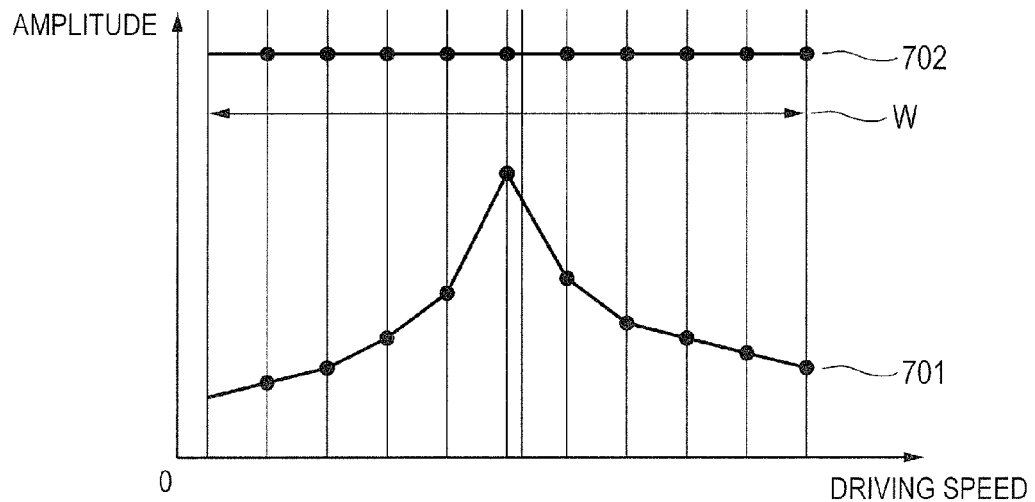
FIGS. 7A and 7B are graphs for describing control of joint speed at the time when the inspection for the robot apparatus illustrated in FIG. 1 is performed.
Figure 7B:
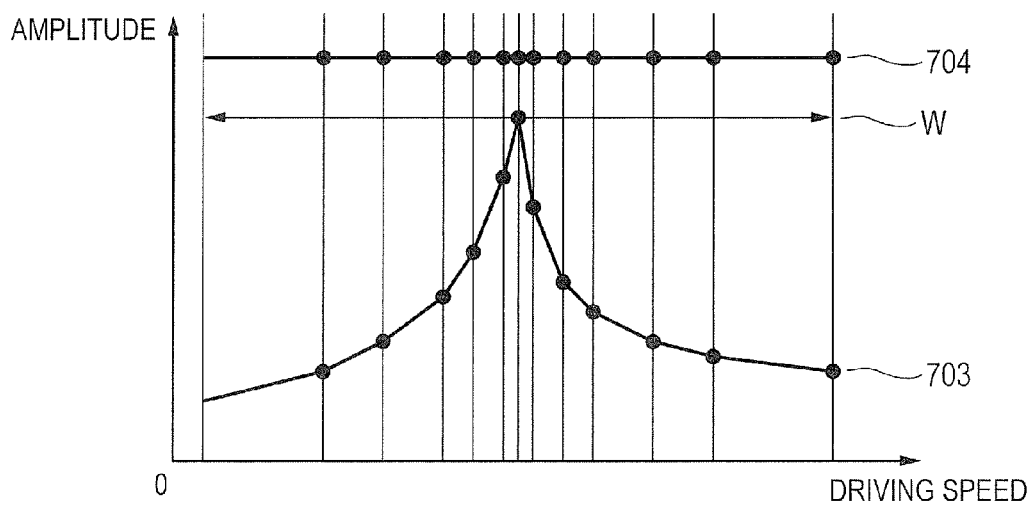

FIGS. 7A and 7B are graphs for describing an example of how to obtain a plurality of inspection speeds. In the example of FIG. 7A, the inspection speed (joint driving speed) is constituted by speed points (black dots) which are obtained by equally dividing the speed range W including the driving speed (motor rotation speed (R)) corresponding to the resonance frequency corresponding to the previously calculated character frequency by about 10 (or another division number). Besides, a waveform 701 corresponds to the resonance amplitude (above decision value A) obtained by each inspection speed, and a waveform 702 corresponds to the reference value $A_{lim}$ (above s405) to be compared with the resonance amplitude (decision value A).

As illustrated in FIG. 7B, in order to further improve detection accuracy of the resonance amplitude, it may be possible to change the driving speed setting with fine steps in the vicinity of the driving speed (motor rotation speed (R)) corresponding to the resonance frequency corresponding to the previously calculated character frequency. More specifically, in FIG. 7B, in the certain speed range W which includes the driving speed (motor rotation speed (R)) corresponding to the resonance frequency, the step width for changing the inspection speed (joint driving speed) is made smaller in the vicinity of the driving speed (motor rotation speed (R)) corresponding to the relevant resonance frequency, as compared with the surroundings. Moreover, it is useful for speed-up of the inspection to make the speed step rough at the speed far from the motor rotation speed (rotation number R) like this. Incidentally, in FIG. 7B, a waveform 703 corresponds to the resonance amplitude (above decision value A) obtained at each inspection speed, and a waveform 704 corresponds to the reference value $A_{lim}$ (above s405) to be compared with the resonance amplitude (decision value A).

The inspection orientation exemplarily shown in FIG. 6 and the inspection sequences (inspection operations) described with reference to FIGS. 7A and 7B can be described by the inspection operation information s407, and are stored in the inspection operation storing unit 407.

Figure 8:
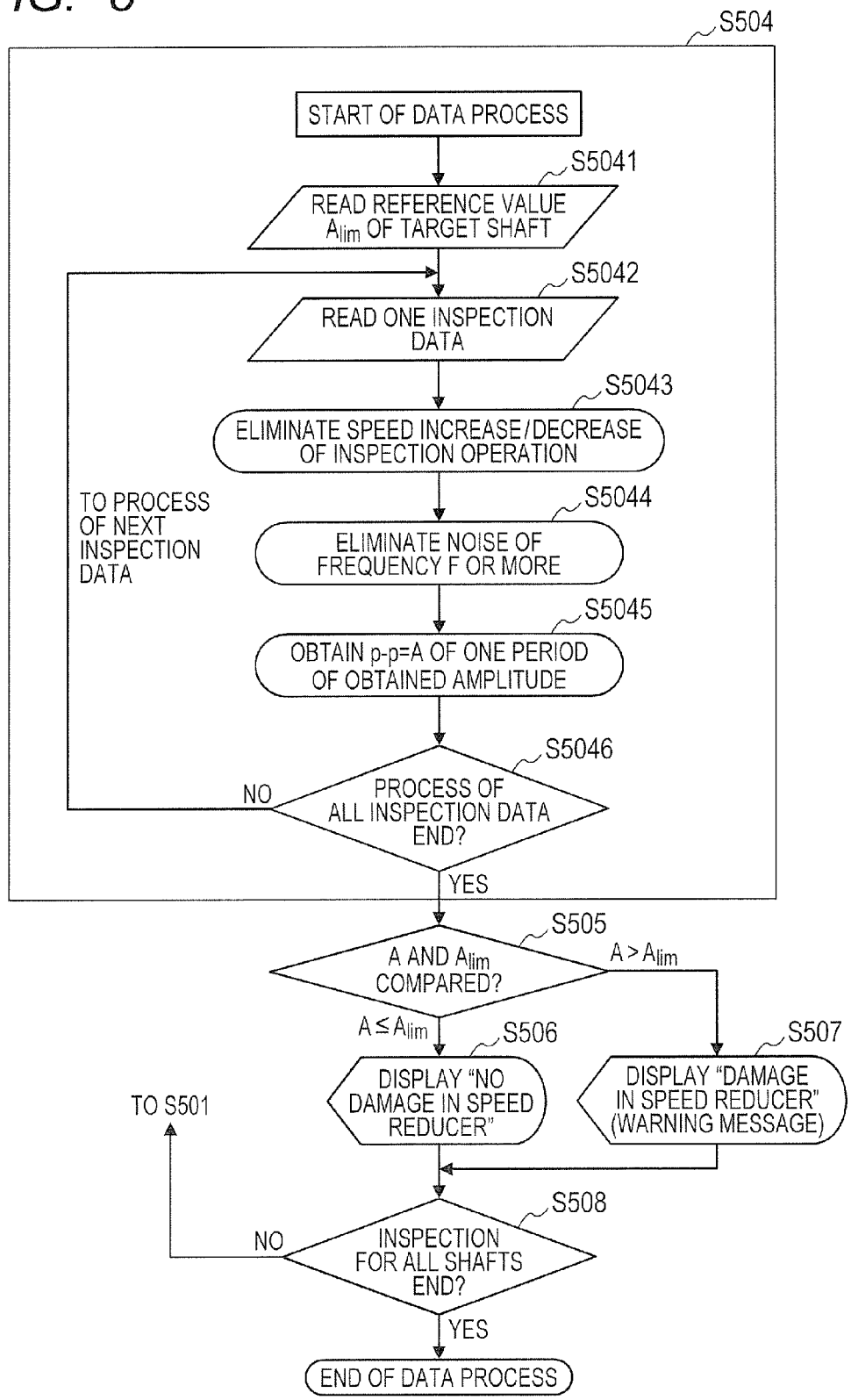
FIG. 8 is a flow chart for describing a calculation procedure to be used to calculate a decision value A from an oscillation inspection result, in the inspection to be performed for the robot apparatus illustrated in FIG. 1.

Subsequently, an example of the process of calculating the angle transmission error by the resonance from the actual output angle information (s402) accumulated in the angle information storing unit 403 in S504 of FIG. 5 will be described in detail with reference to FIG. 8. Here, FIG. 8 shows the concrete process example in S504 and the following steps in the left column of FIG. 5, and S504 is constituted by S5041 to S5046.

Initially, in S5041, the reference value $A_{lim}$ (s405) is read from the reference value storing unit 405, and then the inspection data are processed one by one in the loop of S5042 to S5046.

In S5042, the data are read one by one from the actual output angle information (s402) accumulated in the angle information storing unit 403. Subsequently, in S5043 and S5044, an unnecessary component is eliminated from the read actual output angle information (s402).

That is, since the oscillation component by the resonance is superposed on the movement of the inspection operation itself in the actual output angle information (s402), it is necessary to extract only the resonance component therefrom.

Initially, in S5043, the inspection operation itself is eliminated from the output-side rotation angle of the joint which has been recorded as the actual output angle information (s402). To do so, for example, it is possible to use a method of decreasing a position instruction value of the inspection operation from the output-side rotation angle. Moreover, when the input-side encoder 10 (FIG. 2) is provided in the joint, the output value of the input-side encoder 10 and the angle information obtained from the output-side encoder 16 are synchronously recorded as the actual output angle information (s402). Here, it may be possible to perform a process of subtracting the output value of the input-side encoder 10 from the synchronously recorded angle information of the output-side encoder 16. Incidentally, in this subtracting process, it is needless to say that of course the value converted with the speed reduction ratio N is subtracted.

FIGS. 10A and 10B are diagrams for describing the process of eliminating the inspection operation itself from the output-side rotation angle of the joint. In FIG. 10A, the solid line (1001) indicates the output-side rotation angle (in unit of pulse number) of the joint which is recorded as the actual output angle information (s402). The output-side rotation angle (1001) of the joint corresponds to the actual trajectory (actual output angle information s402) accumulated in the inspection operation performed based on the instruction trajectory of the broken line (1002) instructed by the inspection operation information s407. The information related to the inspection operation itself is eliminated by subtracting the instruction trajectory (1002) from the actual trajectory (1001: output-side rotation angle), thereby obtaining the deviation (1003) illustrated in FIG. 10B. Incidentally, in order to eliminate the inspection operation itself from the output-side rotation angle of the joint, it may be possible to use a method of converting the rotation angle obtained from the output-side encoder 16 into acceleration information by second order differential.

Moreover, in S5044, the frequency component which is equal to or higher than the resonance frequency f [Hz] assumed in the inspection operation is eliminated. Such a process is to eliminate a noise other than the resonance. More specifically, there is a method of eliminating the noise by using a mathematical filter (Butterworth filter, or the like). In this case, it is necessary to select a cutoff frequency and a filter degree to the extent that the component of the resonance frequency f [Hz] is not attenuated or amplified according to the magnitude of the noise. For example, if 2f [Hz] or so is set as the cutoff frequency by using the Butterworth filter having a maximum flat characteristic, it is possible to minimize an influence to the vicinity of the resonance frequency f [Hz]. Moreover, it may be possible to perform a movement averaging process to the output-side rotation angle which has been recorded as the actual output angle information (s402). Also in this case, it is necessary to select an averaging interval to the extent that the component of the frequency f [Hz] is not attenuated or amplified.

In S5045, the maximum value of a peak-to-peak (p-p) corresponding to one period is obtained from the waveform of the calculation results in S5043 and S5044, and the obtained value is calculated as the decision value A of the resonance amplitude.

Figure 9B:
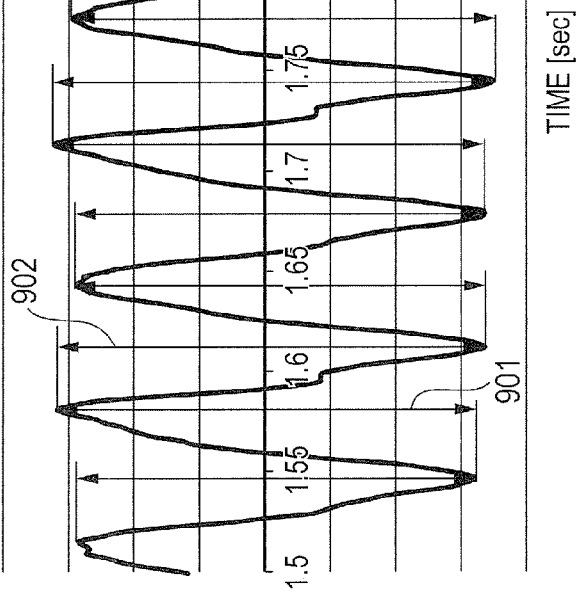
FIGS. 9A and 9B are waveform diagrams for describing a method of generating the decision value A in a diagnosing process (diagnosis mode) of the robot apparatus illustrated in FIG. 1.
Figure 9A:
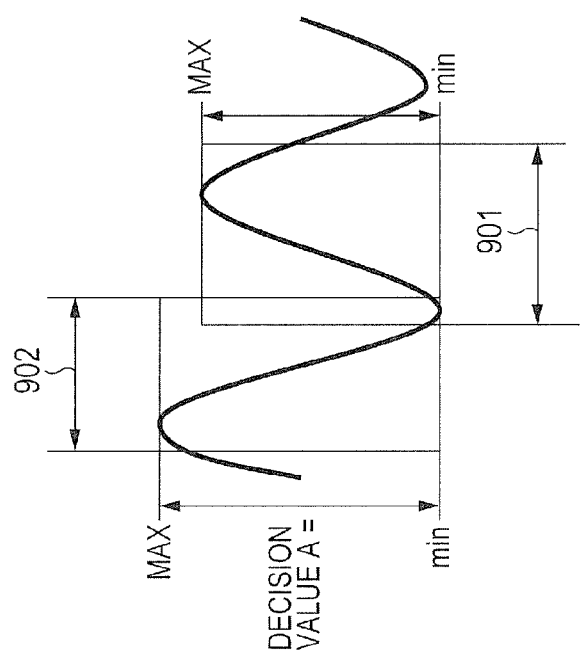

FIGS. 9A and 9B are waveform diagrams for describing an example of the calculation of the decision value A of the resonance amplitude in S5045. In case of the speed reducer 11 to be used for the joint of this type, in the obtained waveform of the resonance amplitude after S5044, the peak values in a rising interval 901 of the waveform and a falling interval 902 of the waveform appear asymmetrically as shown in FIG. 9B. For this reason, while paying attention to one period of the waveform of the resonance amplitude, larger one of p-p in the waveform rising interval 901 and p-p in the waveform falling interval 902 is selected as p-p of the relevant one period (maximum value calculation) as illustrated in FIG. 9A, and the selected value is extracted as the decision value A.

Then, in the above loop of S5042 to S5046, the amplitudes of the rising p-p and the falling p-p in all the periods are obtained, and the maximum value of the obtained amplitudes is calculated as the decision value A of the resonance amplitude.

The processes in S505 and the following steps of FIG. 8 are the same as those described with reference to FIG. 5. Thus, the decision value A of the resonance amplitude calculated as above and the reference value $A_{lim}$ (s405) are compared, and a notification or a warning message is output according to the comparison result.

With respect to the reference value $A_{lim}$ (s405) to be used in the decision (S505), since the value detected by the output-side encoder 16 is the angle information, it is conceivable to use, for example, an allowed angle error as the relevant reference value (allowable value). More specifically, it is conceivable to use the specification value of the angle transmission error of the speed reducer 11, as the reference value. There is a case where the value which has been published as the catalogue specification or the like of the speed reducer 11 can be used as the specification value of the angle transmission error like this. In this case, such a catalogue-published value or the like is used. Alternatively, it is possible to determine the reference value $A_{lim}$ (s405) to be actually used for the relevant joint, by adding and/or subtracting an appropriate margin.

Incidentally, since there is a case where a different type of the speed reducer 11 is used for each joint, it is necessary to prepare the reference value $A_{lim}$ (s405) for each joint. Of course, in above S5041 of FIG. 8, the reference value $A_{lim}$ (s405) which is prepared for the inspection-target joint is read from the reference value storing unit 405. Moreover, in addition to the specification value of the above angle transmission error, it may be possible to calculate a position deviation required for the target joint from the required position accuracy of the hand tip of the robot arm 101 and then use the calculated position deviation as the reference value $A_{lim}$ (s405).

As just described, according to the present embodiment, it is possible to accurately and swiftly detect the state of the transmission which is disposed in the joint of the robot, in accordance with the resonance amplitude of the joint which was measured via the output-side angle sensor of measuring the rotation angle of the output-side rotation shaft of the transmission (speed reducer). For this reason, it is possible to quickly and swiftly decide whether or not to exchange the part of the robot. As a result, there is a significant effect that it is possible to maintain the joint (transmission) of the robot in an appropriate state.

In the above description, the state of the transmission (speed reducer) is diagnosed in each present (this time) diagnosing process (diagnosis mode) by comparing the resonance amplitude measured in the relevant present diagnosing process (diagnosis mode) with the reference value. However, it is conceivable to diagnose the state of the transmission (speed reducer) by using the aspect of change (e.g., change rate) between the resonance amplitude obtained in the past diagnosing process and the resonance amplitude obtained in the present diagnosing process. To do so, for example, the resonance amplitude which is measured in the diagnosing process (diagnosis mode) is stored and accumulated in the database disposed in the HDD 204 or the like. Then, the change rate of the resonance amplitude is calculated from the resonance amplitude of the joint which is obtained in the present diagnosing process (diagnosis mode) and the resonance amplitude which was obtained in the past diagnosing process, and the state of the transmission is diagnosed based on the calculated change rate. For example, a threshold of the change rate is determined in advance. Then, when a change rate (e.g., abrupt change rate) of the resonance amplitude which exceeds the relevant threshold is detected, it is possible to diagnose that the transmission has been damaged or that it is necessary to exchange the transmission because of the lifetime thereof.

The diagnosing method for the robot as described in the above embodiment can be applied to various kinds of robot apparatuses (robots) to be used for manufacturing, e.g., various kinds of articles (industrial products). Here, the robot apparatus (robot) such as a robot arm can arbitrarily be constituted. Namely, the diagnosing method according to the present invention can be carried out for the robot apparatus (robot) if this robot has the joint which connects two or more links. By diagnosing the joint of the robot apparatus with the diagnosing method according to the present invention, it is possible to certainly diagnose and confirm the state (presence/absence of trouble, failure, or damage) of the transmission of the relevant joint, whereby it is possible to maintain the joint (transmission) in the appropriate state. Thus, by using the relevant robot apparatus, it is possible to accurately manufacture target articles in high yield.

Besides, it is conceivable that the diagnosing method for the robot described in the above embodiment is more generally a diagnosing method for a rotation driving apparatus which is constituted by a rotation driving source (motor) and a transmission. In that case, the rotation driving apparatus diagnosing method of the present invention exemplarily described in the above embodiment can be carried out in various kinds of devices and apparatuses as the method of diagnosing the rotation driving apparatuses constituted by the various rotation driving sources (motors) and the transmission.

The present invention can be achieved also in a process that a program for achieving one or more functions of the above embodiment is supplied to a system or an apparatus via a network or a recording medium and then one or more processors in the computer of the system or the apparatus reads out and executes the supplied program. Moreover, the present invention can be achieved also by a circuit (e.g., ASIC) which achieves one or more functions of the above embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-186265, filed Sep. 24, 2015, which is hereby incorporated by reference herein in its entirety.

What is claimed is:

1. A rotation driving apparatus which comprises:
   a rotation driving source configured to drive a joint comprising a first rotation shaft and a second rotation shaft;
   a transmission configured to change a rotation speed of the first rotation shaft driven by the rotation driving source to a rotation speed of the second rotation shaft;
   a sensor provided to obtain a rotation angle of the second rotation shaft; and
   a controller configured to operate the rotation driving source such that the joint resonates, and to diagnose a state of the transmission based on a value calculated by using the rotation angle obtained by the sensor in a case where the joint is resonating.

2. The rotation driving apparatus according to claim 1, wherein, in the case of resonating the joint, the controller is configured to rotate the joint within a speed range including a rotation speed at which the resonance of the joint occurs.

3. The rotation driving apparatus according to claim 1, wherein the controller is configured to control the rotation driving source of the joint in predetermined orientation of the joint.

4. The rotation driving apparatus according to claim 1, further comprising a second sensor provided to obtain a rotation angle of the first rotation shaft,
   wherein the controller is configured to diagnose the state of the transmission based on a difference between values respectively calculated by the sensor and the second sensor.

5. The rotation driving apparatus according to claim 1, wherein the controller is configured to diagnose the state of the transmission by calculating a change rate of value from the value calculated by the rotation angle obtained by the sensor in the case where the joint is resonating and a value calculated by a rotation angle previously obtained by the sensor.

6. A robot apparatus comprising:
   a rotation driving source configured to drive a joint comprising a first rotation shaft and second rotation shaft;
   a transmission configured to change a rotation speed of the first rotation shaft driven by the rotation driving source to a rotation speed of the second rotation shaft;
   a sensor provided to obtain a rotation angle of the second rotation shaft; and
   a controller configured to operate the rotation driving source such that the joint resonates, and to diagnose a state of the transmission based on a value calculated by using the rotation angle obtained by the sensor in the case where the joint is resonating.

7. An article manufacturing method of manufacturing an article by using a robot apparatus:
   the robot apparatus comprising:
   a rotation driving source configured to drive a joint comprising a first rotation shaft and a second rotation shaft;
   a transmission configured to change a rotation speed of the first rotation shaft driven by the rotation driving source to a rotation speed of the second rotation shaft;
   a sensor provided to obtain a rotation angle of the second rotation shaft; and
   a controller, the method comprising:
   the controller operating the rotation driving source such that the joint resonates; and
   the controller diagnosing a state of the transmission based on a value calculated by using the rotation angle obtained by the sensor in a case where the joint is resonating.

8. An article manufacturing method of an article manufactured by a rotation driving apparatus, the rotation driving apparatus comprising:
   a rotation driving source configured to drive a joint comprising a first rotation shaft and a second rotation shaft;
   a transmission configured to change a rotation speed of the first rotation shaft driven by the rotation driving source to a rotation speed of the second rotation shaft;

a sensor provided to obtain a rotation angle of the second rotation shaft; and a controller, the method comprising:

the controller operating the rotation driving source such that the joint resonates; and the controller diagnosing a state of the transmission based on a value calculated by using the rotation angle obtained by the sensor in a case where the joint is resonating.

9. The robot apparatus according to claim 6, wherein the controller is configured to compare a predetermined value with the value calculated by using the rotation angle obtained by the sensor in the case where the joint is resonating, and to output a warning in a case where the value calculated by using the rotation angle obtained by the sensor is larger than the predetermined value.

10. The robot apparatus according to claim 6, wherein, in the case of resonating the joint, the controller is configured to rotate the joint within a speed range including a rotation speed at which the resonance of the joint occurs.

11. The article manufacturing method according to claim 7, further comprising the controller comparing a predetermined value with the value calculated by using the rotation angle obtained by the sensor in the case where the joint is resonating, and outputting a warning in a case where the value calculated by using the rotation angle obtained by the sensor is larger than the predetermined value.

12. The article manufacturing method according to claim 7, wherein, in the case of resonating the joint, the controller rotates the joint within a speed range including a rotation speed at which the resonance of the joint occurs.

13. The article manufacturing method according to claim 8, further comprising the controller comparing a predetermined value with the value calculated by using the rotation angle obtained by the sensor in the case where the joint is resonating, and outputting a warning in a case where the value calculated by using the rotation angle obtained by the sensor is larger than the predetermined value.

14. The article manufacturing method according to claim 8, wherein, in the case of resonating the joint, the controller rotates the joint within a speed range including a rotation speed at which the resonance of the joint occurs.

15. A controlling method of a rotation driving apparatus which comprises:

a rotation driving source configured to drive a joint comprising a first rotation shaft and a second rotation shaft; a transmission configured to change a rotation speed of the first rotation shaft driven by the rotation driving source to a rotation speed of the second rotation shaft; and a sensor provided to obtain a rotation angle of the second rotation shaft, the controlling method comprising:

operating the rotation driving source such that the joint resonates; and diagnosing a state of the transmission based on a value calculated by using the rotation angle obtained by the sensor in a case where the joint is resonating.

16. The controlling method according to claim 15, further comprising comparing the value calculated by using the rotation angle obtained by the sensor in the case where the joint is resonating with a predetermined value, and outputting a warning in a case where the value calculated by using the rotation angle obtained by the sensor is larger than the predetermined value.

17. The controlling method according to claim 15, wherein, in the case of resonating the joint, the joint is rotated within a speed range including a rotation speed at which the resonance of the joint occurs.

18. The rotation driving apparatus according to claim 1, wherein the controller is configured to compare a predetermined value with the value calculated by using the rotation angle obtained by the sensor in the case where the joint is resonating, and to output a warning in a case where the value calculated by using the rotation angle obtained by the sensor is larger than the predetermined value.

19. The rotation driving apparatus according to claim 2, wherein the controller changes stepwise the rotation speed of the joint within the speed range.

20. A non-transitory computer-readable storage medium storing a control program for performing a controlling method of a rotation driving apparatus which comprises:

a rotation driving source configured to drive a joint comprising a first rotation shaft and a second rotation shaft; a transmission configured to change a rotation speed of the first rotation shaft driven by the rotation driving source to a rotation speed of the second rotation shaft; and a sensor provided to obtain a rotation angle of the second rotation shaft, the program comprising code to execute:

operating the rotation driving source such that the joint resonates; and diagnosing a state of the transmission based on a value calculated by using the rotation angle obtained by the sensor in a case where the joint is resonating.

* * * * *